(No Model.)
C. HELLER.
BEER COOLING DEVICE.
No. 583,370.        Patented May 25, 1897.
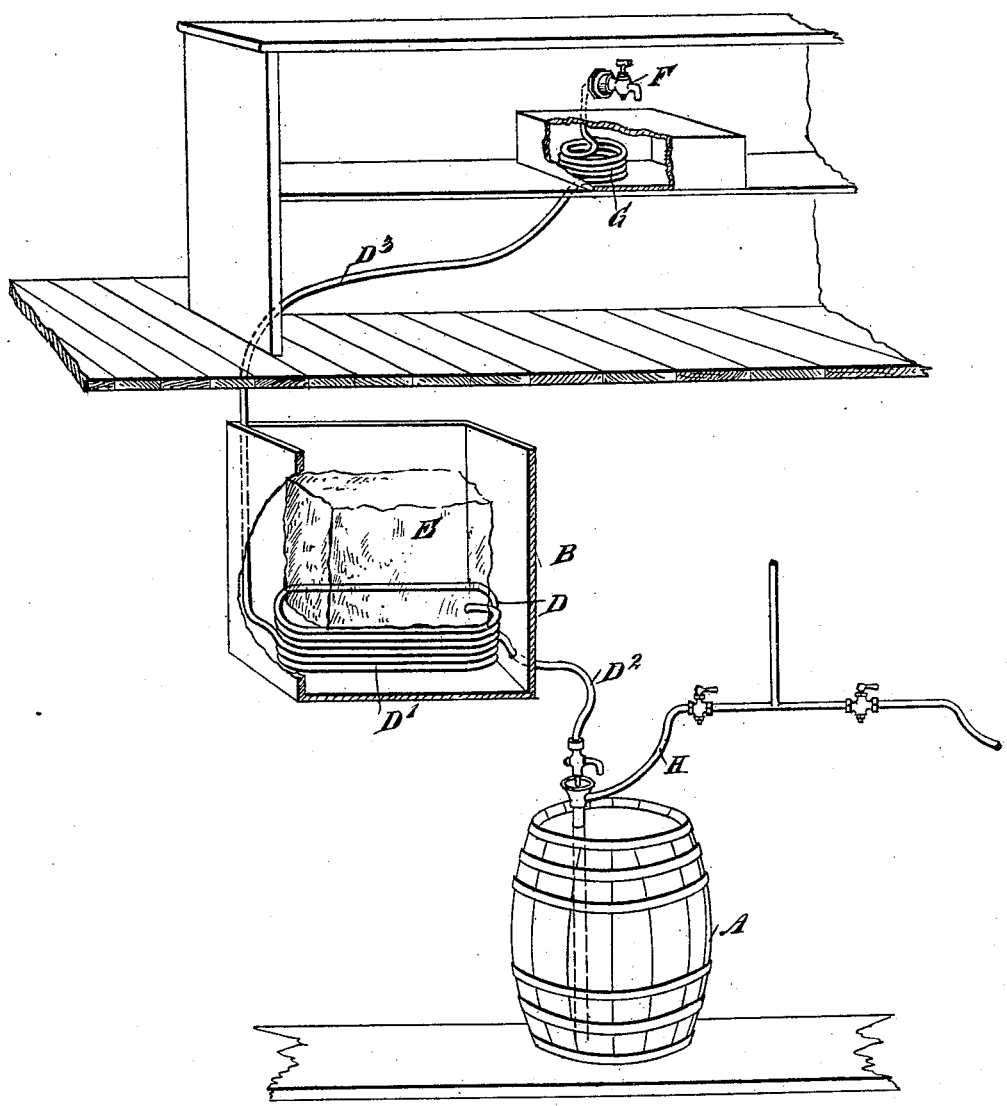
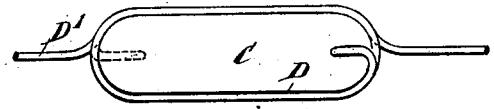
WITNESSES:
INVENTOR
C. Heller.
BY
ATTORNEYS.

UNITED STATES PATENT OFFICE.

CONRAD HELLER, OF BROOKLYN, NEW YORK, ASSIGNOR, BY DIRECT AND MESNE ASSIGNMENTS, OF TWO-THIRDS TO JOHN J. CARR AND WILLIAM LEE, OF SAME PLACE.

BEER-COOLING DEVICE.

SPECIFICATION forming part of Letters Patent No. 583,370, dated May 25, 1897.

Application filed September 12, 1896. Serial No. 605,574. (No model.)

*To all whom it may concern:*

Be it known that I, CONRAD HELLER, of Brooklyn, in the county of Kings and State of New York, have invented a new and Improved Beer-Cooling Device, of which the following is a full, clear, and exact description.

My invention relates to devices for cooling beer before drawing the same at the bar.

It consists, essentially, of placing between the beer-barrel and the faucet a cooling-chamber which shall contain a vessel which is connected at top and bottom to the faucet and the barrel. The pipes connecting this vessel with the faucet and the barrel are coiled about the cooling vessel before being led away. This box or cooling vessel and its surrounding coils are placed in the bottom of a small ice-box, the ice being placed upon the same.

Reference is to be had to the accompanying drawings, forming a part of this specification, in which similar characters of reference indicate corresponding parts in all the figures.

Figure 1 is a perspective view of my device. Fig. 2 is a plan view of the cooling box or vessel and its encircling pipes, and Fig. 3 is a sectional elevation of the same.

In the plan ordinarily adopted for cooling beer the beer-barrels themselves are placed within a cooling-chamber, and the cooling is done by extracting the heat of the beer through the sides of the barrel. As the sides of the barrel are of wood, which is a poor conductor of heat, this is a slow process and requires a large amount of ice. The cooling-coils placed close to the faucet are not of sufficient capacity to cool the beer as fast as it is drawn. In consequence of these facts it is frequently the case that in rapid drawing the beer will come warm. My device is intended to obviate this and to make it impossible to draw the beer fast enough to have it come warm and to cool the same by applying the ice more directly to the beer itself and cooling the beer inside the barrel instead of from the outside.

The relative location of the parts is shown in Fig. 1, in which A represents the beer-barrel; B, a cooling-chamber which contains coils and the box in which the cooling is done, and F the faucet, which is located at the bar. The box B, forming the cooling-chamber, is of comparatively small size and contains within the same an entirely-closed metallic box C. This box is made of planished copper, having the planished surfaces inside. As the copper is a good conductor of heat the beer will be rapidly cooled through the sides of the box. The planished surfaces will also prevent chemical action of the beer upon the box. This box is flat in shape, having rounded ends. The rounding of the ends of the box is not an essential feature, but is done in order that the pipe-coils which are placed about the box may be bent around the ends and lie closely thereto. This box is connected at the top and bottom to small pipes D and D', which enter the box at top and bottom. They are then bent toward the edge of the box and then coiled about the same from the edge toward the center. They leave the box at each end at about the center of its height and are connected one directly to the barrel and the other to the faucet at the bar or to the auxiliary cooling device G, which is located close to the faucet. These pipes D and D' are made of block-tin or other metal which resists the action of the beer. This box C and the coil-pipes D and D' are placed in the bottom of the small ice-chest or cooling-chamber B, the ice being placed on top of the box C. The air-pressure pipes are connected to the barrel, as shown at H. These pipes furnish air under pressure to the beer-barrel and thus force the beer to any elevation desired. The pipe $D^2$, connecting the cooling-box C and the barrel, should be as short as possible. The cooling-chamber B should also be located over the barrel A. The pipe D', leading from the cooling box or vessel C toward the faucet, may be led in any direction or manner desired.

When the apparatus is connected to a new barrel of beer, the air-pressure will force the beer through the coils D and D' and fill the box C. The ice being in direct contact with these, and they being good conductors, the beer contained therein will be rapidly cooled. As cooled liquids are more dense than warm, the tendency will be for the cool beer to settle to the bottom of the barrel and its place to be taken by warmer beer, which will rise through the pipe. In consequence of this tendency the beer in the barrel will be cooled by direct contact with a good conductor, which is also in direct contact with the ice. By reason of this the cooling effect will be much more rapid than where the ice is applied to the outside of the barrel itself and the cooling is done through the staves of the barrel.

The auxiliary cooling device G is the common cooling device now used in connection with bars. This may be used or omitted, as desired. By reason of the action herein mentioned, by which the beer is cooled within the barrel, and also by reason of the additional storage capacity and cooling-surfaces provided by my device, the beer cannot be drawn from the faucet under any ordinary conditions sufficiently fast to have the beer come warm.

The amount of ice required for this device is also much less than that required by the ordinary process. A small cooling-chamber or ice-chest which is large enough to hold the cooling-box C and the coil-pipes surrounding the same will be sufficient for the purpose. It will thus require but a very small portion of the ice necessary where the cooling is done directly to the barrel itself by the common process. This will result in a large saving of ice without the beer being delivered warm.

The peculiar manner of connecting the pipes D and D' to the box C and of coiling the same about this box makes it immaterial which end of the box C is connected to the barrel and which to the faucet. They are in this way reversible.

Having thus described my invention, I claim as new and desire to secure by Letters Patent—

In a beer-cooling device, the combination with the air-pressure apparatus, of a cooling-chamber located above the beer-barrel, a closed box or vessel therein, a pipe connecting to the top and another to the bottom of said box or vessel, said pipes coiling about the box or vessel from the side toward the middle, and connections from one of said pipes to the beer-barrel and from the other to the faucet, substantially as described.

CONRAD HELLER.

Witnesses:
H. L. REYNOLDS,
JAMES M. HENLEY.